April 18, 1939. J. H. ROBINSON 2,154,867
BUSHING PULLER
Filed Nov. 17, 1936
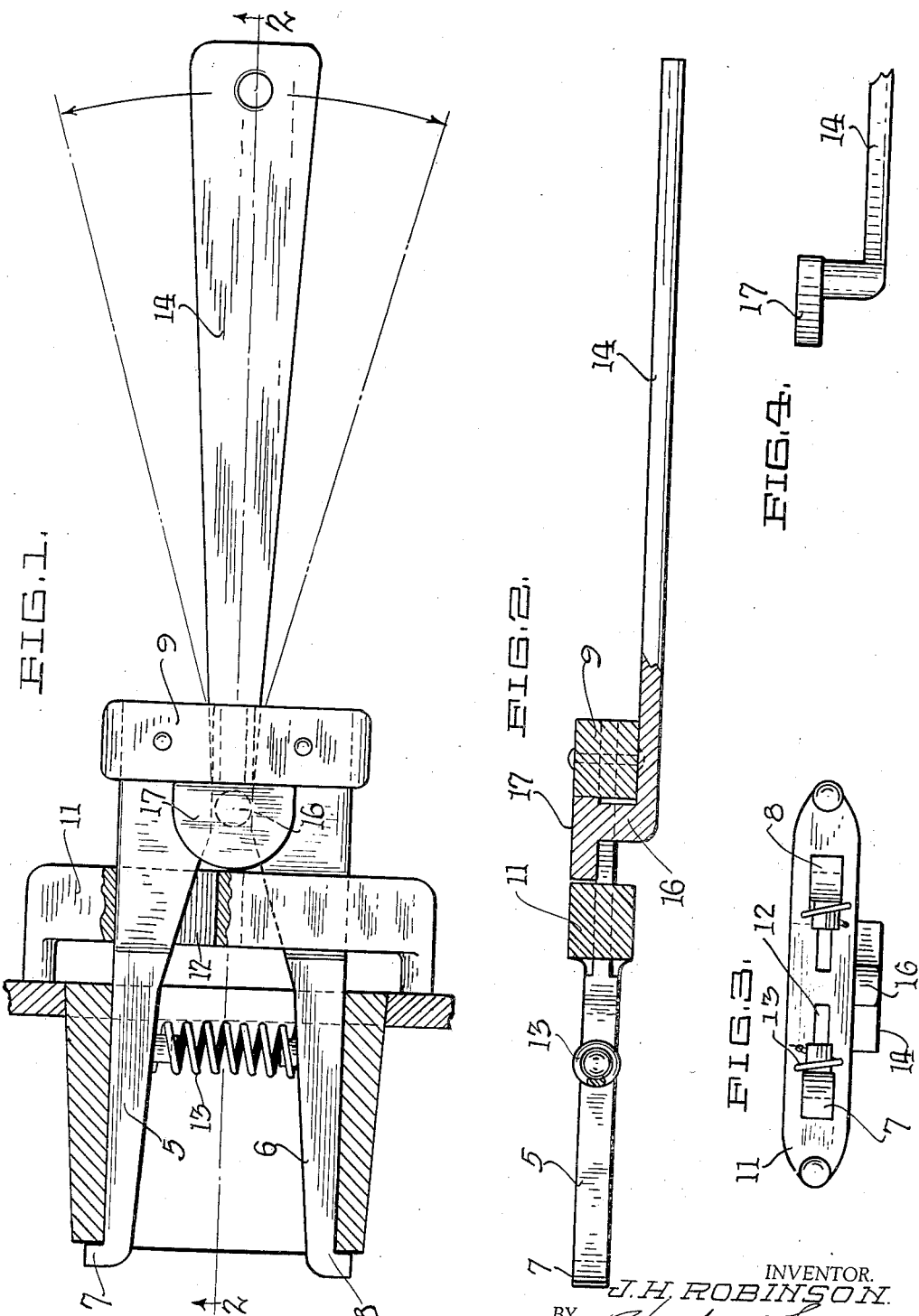
INVENTOR.
J. H. ROBINSON.
BY
ATTORNEYS.

Patented Apr. 18, 1939

2,154,867

UNITED STATES PATENT OFFICE 2,154,867

BUSHING PULLER

James H. Robinson, Atascadero, Calif.

Application November 17, 1936, Serial No. 111,281

1 Claim. (Cl. 29—88.2)

This invention relates to improvements in bushing pullers.

The principal object of the invention is to produce a device which will grasp and extract a bushing without injuring the bushing and with a minimum amount of effort.

A further object is to produce a device which will accommodate various sizes of bushings within the length of the tool.

A still further object is to produce a device which is economical to manufacture and that is easily portable and workable even under adverse conditions.

Other objects and advantages will be apparent during the course of the following description.

In the accompanying drawing forming a part of this specification and in which like numerals are employed to designate like parts throughout the same, Fig. 1 is a side elevation of my tool, showing the same in use and having a portion thereof broken away, Fig. 2 is a cross sectional view on the line 2—2 of Fig. 1, showing a portion of the handle in elevation, Fig. 3 is an end view of my tool showing the spring broken away, and Fig. 4 is a fragmentary side elevation of the headed end of the wedge shaped operating lever.

Stopcock bushings are generally used wherein a very tight fit must occur so that it is often necessary to drive the bushings into position. After these bushings become worn they must be removed and replaced and it is to remove such bushings that I have perfected my device.

My device consists of members 5 and 6, each having a hooked extremity 7 and 8, respectively. These members 5 and 6 are pivotally mounted in a yoke 9. Slidable thereon is a bearing bar 11 which bar is slotted as shown at 12 so that the members 5 and 6 may pass therethrough. A spring 13 tends to keep the members 5 and 6 spread apart. A wedge-shaped operating handle 14 is provided and embodies an angularly disposed bearing portion 16 to which is secured a head 17. The head 17 normally bears against the yoke 9 and against the bearing bar 11, as shown in Fig. 1 when the device is not in use but when it is desired to draw a bushing the same is swung to the dotted line position of Fig. 1, causing a camming action between the yoke 9 and bearing bar 11, which act causes the hooked ends 7 and 8 to be drawn toward the bar 11, thus drawing the same outwardly with the bushing.

As a result of this construction, when the members 5 and 6 are moved toward each other, the distance between the outer surface of the ends 7 and 8, is reduced. Therefore, the ends may be inserted in the bore of a stop-cock bushing and pushed therethrough. As soon as the ends clear the end of the bushing, the spring 13 functions to cause the ends 7 and 8 to snap behind the bushing to securely grip the same so that it may be readily extracted from the stopcock as hereinbefore described.

It will thus be seen that the device will accomplish all the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

In a device of the character described, a yoke having a pair of hooked members pivoted therein, a bearing bar slidable on said hooked members and straddling said hooked members, a spring positioned between said hooked members to cause the free end of said hooked members to normally spread apart, an operative handle having an offset head comprising an enlarged part and a reduced part, said reduced part extending between said hooked members and the enlarged part engaging said yoke and said bar, the portion of the enlarged part engaging said yoke being flat, whereby when said handle is moved about its fulcrum point, a camming action will spread said yoke and said bar away from each other.

JAMES H. ROBINSON.